United States Patent Office 3,544,586
Patented Dec. 1, 1970

3,544,586
METHOD OF PREPARING PHTHALOCYANINE PIGMENTS
Volney Tullsen, Westfield, N.J., assignor to GAF Corporation, New York, N.Y., a corporation of Delaware
No Drawing. Filed Nov. 9, 1965, Ser. No. 507,046
Int. Cl. C09b 47/04
U.S. Cl. 260—314.5                    4 Claims

ABSTRACT OF THE DISCLOSURE

A process for preparing phthalocyanine pigments which comprises (1) forming a salt of a phthalocyanine starting material, and (2) thereafter regenerating the free phthalocyanine in the presence of a water-soluble salt and a liquid material during or after a milling operation.

---

The present invention is directed to a novel method for the production of phthalocyanine pigments. More particularly, the present invention is directed toward a method for the production of such pigments which comprises forming a salt of a phthalocyanine and then regenerating the free phthalocyanine during or after a milling operation.

In the past, phthalocyanine pigments have been made by various processes, e.g., conventional acid pasting, swelling or milling. However, such operations as acid pasting, permutoid swelling and even acid milling, require a great amount of acid in the production of suitable pigments and thus are not economically desirable. Salt milling processes have also been employed in phthalocyanine pigment production. Such processes, however, suffer from the necessity of employing long milling times and exceptionally heavy-duty, high powdered machines to perform the milling and mixing operation.

In contrast, it has now been found that by the employment of the present process wherein a salt of phthalocyanine is first produced and the free phthalocyanine regenerated during or after a milling operation only sufficient mixing to insure good contact between the various materials need be employed. Once the materials are well mixed, further mechanical work is not necessary. This, therefore, allows for the use of less heavy duty and less high powered equipment than needed in the conventional salt milling operation. The present invention furthermore allows the use of much less acid than is needed in conventional acid pasting, permutoid swelling or acid milling operations, and a much shorter operating time than in a good salt milling operation. The present invention possesses advantage particularly over a permutoid swelling method whether carried out in slurry or paste milling, in the exceptionally good reproducibility of the method and insensitivity to moderate changes in composition or temperature.

It is therefore a primary object of the present invention to provide a process for the production of phthalocyanine pigments which obviates the inherent deficiencies of prior art processes.

It is a further object of the present invention to provide such a process which requires much less acid than prior processes and allows the utilization of shorter milling times and more economical equipment while retaining exceptionally good reproducibility of results.

It is still a further object of the present invention to to provide a process for the production of phthalocyanine pigments wherein a salt of the phthalocyanine material is formed and the free phthalocyanine is regenerated after or during a milling operation.

It is yet a further object of the present invention to provide a process for the production of phthalocyanine pigments which comprises forming a salt of the phthalocyanine material by reaction with an acid material and thereafter regenerating the free phthalocyanine after or during a milling operation in the presence of salts and a liquid medium.

Still further objects and advantages of the present invention will become more apparent from the following more detailed description of the invention.

In general, the process of the present invention comprises charging a phthalocyanine starting material and a strong acid, e.g., sulfuric acid, into a reactor to produce a salt of the phthalocyanine material. A free phthalocyanine is then regenerated by the addition of a salt and liquid to the salt of the phthalocyanine material either during or after a milling operation. While mixing is necessary to allow adequate contact of materials, after all of the materials have been adequately interspersed, further mixing is not necessary for the production of the pigments of the present invention. The phthalocyanine pigments so produced can be isolated by any conventional means, as by drowning in water, with subsequent filtering, washing and drying of the product.

Grinding phthalocyanines wet or dry in ball mills or in a heavy paste in a mixer such as a Werner Pfleider, is well known. The advantage of grinding a salt of phthalocyanine is that higher strength is obtained in a shorter time. Another advantage is the production of a red shade of phthalocyanine blue in a short time compared to very long times for ordinary salt milling.

It is believed that part of the reason for the good results of this method is that the salts of phthalocyanine are more friable than free phthalocyanine and consequently are easier to grind down to pigmentary size. Another reason is that by selection of the proper salts and liquids as media for the grinding, a slow regeneration of the free phthalocyanine occurs while it is being ground. It is assumed that this controlled decomposition of the acid salt creates an optimum condition for producing high strength pigments.

The salts of phthalocyanine of the present invention are prepared by reacting a phthalocyanine starting material with an aqueous solution from about 1 to 8 mols of a strong acid material per mol of the phthalocyanine. By such a reaction, the acid is bound to the phthalocyanine so that the water present evaporates readily. Heating at 85–90° C. overnight will evaporate all of the water leaving a hard cake.

The temperature and pressure of this reaction are not critical and the preferred process is usually run under normal room temperature at atmospheric pressure conditions.

The strong acids which have been found particularly useful in the process of the present invention are sulfuric acid, phosphoric acid, toluene sulfonic acid, trifluoroacetic acid, chlorosulfonic acid, ethyl sulfuric acid, trichloroacetic acid, etc. Actually, any strong, nonvolatile acid will function in the process of the present invention. Of these acids, sulfuric acid is preferred.

The phthalocyanine starting material which is employed in accordance with the present invention can be any material conventionally employed in the production of pigments. Such materials include, for example, the metal free phthalocyanine and metallic phthalocyanines such as copper phthalocyanine, aluminum phthalocyanine, etc. These materials can be employed in a crude form such as crude phthalocyanine blue, copper phthalocyanine crude, etc. again, any conventional material can be employed and the foregoing are only illustrative of various types of such materials.

An alternative method for the production of the salts of the present invention is to add the acid material slowly to a Heliogen Blue Base with mixing. In both methods, when sulfuric acid is used with a mixer such as a Werner Pfleider, the acid is absorbed with a mild exotherm, and the shade of the product becomes greener with increasing sulfuric acid and becomes a true green when 8 mols (1.36 parts per part of the phthalocyanine material, e.g., phthalocyanine blue) have been added. The product is a dry powder with this amount of acid whereas increasing the acid gives a gummy material at about 1.7 parts and a paste when about two parts have been added. The other strong acids usable in the process of the present invention behave in a similar manner. Thus, by the employment of about 1 to about 8 mols of acid per mol of phthalocyanine material with the subsequent milling according to the present invention, it is possible to produce a strong phthalocyanine pigment with a high solids filter cake which dries to give a soft textured powder easily incorporated into inks, paints, enamels, plastics, etc.

The preferred method is to form the acid salt of a phthalocyanine in a Werner Pfleider or some similar mixing device, add a salt and mix until uniform and then add a liquid to obtain a kneading mass. It is preferred that the salt be a water soluble metal salt of a nonvolatile acid. It is also preferred that the salt be comparatively inert to the acid being used. Sulfates and acid sulfates of the alkali metals are suitable as are water soluble sulfates of other metals such as aluminum, iron, magnesium or copper. Alkali metal phosphates and acid phosphates can also be used and salts of organic acids such as sodium acetate are suitable.

A variety of liquids can be used also. These should be liquid at ordinary temperatures and comparatively inert to the acid employed. Water soluble liquids are preferred but water insoluble liquids such as xylene can also be used advantageously. Suitable liquids are water, low molecular weight carboxylic acids, e.g., acetic acid, propionic acid, butyric acid, etc., alcohols, e.g., methyl alcohol, propyl alcohol, butyl alcohol, octyl alcohol, etc., glycols, e.g., ethylene glycol, diethylene glycol, propyene gycol, etc., esters, e.g., alkyl esters of low molecular weight, carboxylic acid such as methyl acetate, butyl acetate, butyl propionate, etc., and ketones, e.g., methylethylketone, methylisobutylketone, etc. It should be understood that when a carboxylic acid such as acetic acid is used, this acid is too weak to react with phthalocyanines and is used chiefly to provide a paste or slurry for grinding or milling.

The salts and liquids have been specified as being comparatively inert to the acid. However, some reactivity is allowable or even desired. Good results are obtained with a salt which will react slowly with the acid causing a slow decomposition of the phthalocyanine acid complex. In a similar manner, the liquid may decompose the complex and regenerate the free phthalocyanine. Large amounts of water cause rapid and complete decomposition of phthalocyanine-sulfates while benzene has very little if any, such effect. The activity of a liquid in this respect can be predicted to some extent by its Specific Inductive Capacity. Water with a S.I.C. of 79 is very active while benzene with a S.I.C. of 2.3 is inactive. Ethylene glycol with a value of 37 is moderately active. Too much reliance should not be placed on the Specific Inductive Capacity since actual chemical reactions or various complex addition compounds between the acid and the liquid can occur.

The success of this method depends on having the proper balance of the kind and amount of acid, salt and liquid. When sulfuric acid is used, and sodium sulfate is the salt, a wide variety of liquids can be used but best and most consistent results are obtained with liquids having a Specific Inductive Capacity of about 30 to 40 of which ethylene glycol is a good example.

The relative amounts by weight of the acid, salt and liquid are of importance. When sulfuric acid, sodium sulfate and ethylene glycol are used, these should be in about the proportion of 20 sulfuric acid 60 sodium sulfate and 20 ethylene glycol. Relative amounts of sulfuric acid, sodium sulfate, and water should be in about the proportions of 25–55–20 for best results. In either of the above systems, the mass may become too heavy to mix, or it may even solidify. This may happen for the $$H_2SO_4-NaSO_4$$

glycol systems if the tenary mixture contains less than 20% $H_2SO_4$. The danger zone for the $H_2SO_4-H_2O$ system is for mixtures containing less than 20% water.

For 100 parts of copper phthalocyanine, the effect of the amounts of acid, salt, and liquid can be shown in tabular form; comparison is with Heliogen Blue DS Toner, a strong commercial pigment.

| $H_2SO_4$ | $Na_2SO_4$ | Glycol | Evaluation |
| --- | --- | --- | --- |
| 135 | 400 | 120 | Distinctly lighter plus 20% slightly red. |
| 109 | 300 | 155 | Slightly darker plus 15% slightly red. |
| 70 | 300 | 120 | Considerably lighter plus 10% distinctly red. |
| 35 | 300 | 80 | Slightly darker plus 2% slightly red. |
| 20 | 60 | 30 | Much lighter minus 25% distinctly red. |

This shows that best results are obtained with ratios of about:

Phthalocyanine blue _____ 100
$H_2SO_4$ _____ 100–135
$Na_2SO_4$ _____ 300–400
Glycol _____ 120–160

In Werner Pfleider operations, time and temperature are not usually critical factors and this is an advantage for this method.

Mixers with slow and inefficient mixing have given as good results as are obtained in fast and well-designed mixers. When mixing is poor, somewhat longer times are needed for the addition of the acid and the liquid which should be added only as fast as they will mix into the batch.

Of course, mixtures of acids, mixtures of salts and mixtures of liquids can all be employed by the process of the instant invention and are deemed to be within the scope thereof.

It is important to note that by the process of the present invention, in contradistinction to a prior art salt milling process, only sufficient mixing to insure good contact between the various materials need be employed. Once the materials have been well mixed, further mechanical work is not necessary and the production of extremely fine pigments can proceed with relative ease.

The following examples are given by way of illustration of various embodiments of the present invention. It is to be understood, however, that such examples are by illustration only and are not to be deemed as limitative of the invention described. Unless otherwise stated, all percentages are by weight.

EXAMPLE I

In a small Werner Pfleider mixer with "sigma" blades revolving at 9 r.p.m. and 18 r.p.m., 20 gms. phthalocyanine blue crude was charged. With mixing over about 15 minutes, 27 gms. 100% sulfuric acid was added. The temperature rose from 25° C. to 35° C. After mixing for 1 hour to get a dark green dense powder, 80 gms. $Na_2SO_4$ anhydrous were added. This was then mixed for 1 hour to obtain an olive green powder. During this time, the temperature rose to 45° C. Then, 23 gms. ethylene glycol were added over a period of from 1 to 2 minutes. The temperature rose to 50° C. and the charge became a dark greenish blue paste. After mixing for 3 hours, the temperature rose to 60° C. The pigment was recovered by discharging the mass into 1000 ml. water, stirring and heating the slurry to 70° C., filtering, washing with hot water until free of acid, and drying at 80° C.

This pigment, when tested in lithographic varnish, compared to a high quality commercial red shade phthalocyanine blue pigment, was similar in shade but was 20%

EXAMPLE II

Example I was repeated except that a crude copper phthalocyanine having 4.5% chlorine was used. The product was similar to the product of Example I but was slightly weaker and greener. It had excellent resistance to crystal growth in solvents and had good nonflocculating properties in paints and enamels.

EXAMPLE III

Example I was again repeated except that a mixture of 18.5 parts copper phthalocyanine and 1.5 parts of aluminum phthalocyanine was employed. The product was a strong red shade phthalocyanine blue with excellent stability and flocculation properties.

EXAMPLE IV

In a quart mixer with sigma blades which rotate at 80 r.p.m., 230 gms. copper phthalocyanine crude was charged. With mixing, over about 1 hour, 275 gms. sulfuric acid 100% were added. Mixing was continued for another hour to obtain a dark green powder containing copper phthalocyanine and sulfuric acid in the ratio of 1 mol to 7 mols.

EXAMPLE V

In a quart mixer, 335 gms. of copper phthalocyanine hepta sulfate from Example IV were charged. Then 415 gms. anhydrous sodium sulfate were added and the system mixed for 2 hours. The temperature rose from 25° C. to 33° C. Then, 35 gms. of water was added, dispersed over a period of 5 minutes. The temperature rose to 45° C. and the charge was a dark green blue powder. This material was then mixed for 30 minutes and 20 gms. of the charge was removed. Pigment sample A was recovered by adding the powder to 100 ml. of water, stirring, heating, filtering, washing and drying. Mixing was continued to the main charge and 40 gms. water were added over a 5 minute period. Mixing was continued for 30 minutes and 20 gms. of the powder were removed to give pigment Sample B. Then, over 30 minutes, 60 gms. water were added slowly to yield a heavy, dark greenish blue paste. This was then mixed for 4 more hours and discharged to 2000 ml. of water pigment Sample C was isolated. These samples were compared in lithographic varnish with a strong commercial phthalocyanine blue pigment. They were about the same shade but Sample A was 10% weak, Sample B was 7% weak, and Sample C was 20% strong. The filter cake corresponding to Sample C had a solids content of 35% and gave high strength in textile prints on cotton by both the O/W and W/O resin bonded textile printing systems.

EXAMPLE VI

In a small mixer, 27.5 gms. crude phthalocyanine blue were charged and 18.5 gms. sulfuric acid 100% were added to give a phthalocyanine tetra sulfate. Then 48.0 gms. of sodium sulfate were added and the system mixed for 30 minutes. Then, over a period of 30 minutes, 25.0 gms. water were added. The mass was mixed for 2 hours and the pigment recovered. The product was equal in strength to the commercial pigment but was 20% weak compared to the product of Example V.

EXAMPLE VII

In a quart mixer, 140 gms. of crude phthalocyanine blue were charged and over a period of 30 minutes, 280 gms. of 68% sulfuric acid were added thereto. The system was mixed for 1 hour to obtain a lumpy greenish blue powder. Then, 440 gms. of $Na_2SO_4$ were added. After about 5 minutes, the charge became a heavy, dark blue, milling mass. After mixing for 4 hours, the pigment was isolated by drowning to 3000 cc. water, filtering, washing, and drying. The produce was similar to the commercial pigment but was 5% weak.

EXAMPLE VIII

In a quart mixer, 140 gms. of crude phthalocyanine blue were charged, and then 190 gms. 100% sulfuric acid were slowly added thereto. The system was mixed for 1 hour to obtain a uniform green powder. Then 440 gms. of $Na_2SO_4$ were added and mixed for 1 hour. Then, 45 gms. of water were added and the system mixed for an additional 10 minutes. The charge was a greenish blue powder. After adding 45 gms. of water, the charge became a heavy mixing mass. The system was further mixed for 4 hours and the pigment recovered. The product was similar in shade to the product of Example VII but was 20% stronger.

EXAMPLE IX

Example I was repeated except that the phthalocyanine and sodium sulfate were charged first, followed by the acid and the ethylene glycol. Results were equal to Example I.

EXAMPLE X

Some 40 gms. of phthalocyanine blue tetra sulfate made by the general method of Example IV, were placed in a mixer. To this were added 70 gms. sodium sulfate. This was mixed a few minutes, until uniform, and then 30 gms. normal butyl alcohol were added over a period of about 1 hour. The mass was mixed for 1 hour and the pigment was recovered. It was about the shade and strength of a good commercial phthalocyanine.

EXAMPLE XI

Example X was repeated using 40 gms. of glacial acetic acid in place of the butyl alcohol. The resulting pigment had good strength and was unusually greenish.

EXAMPLE XII

Example I was repeated except that in place of ethylene glycol, 40 gms. of xylene were used. The pigment was recovered by washing out the xylene with ethanol followed by a water wash. The product tested in lithographic varnish had a light masstone and was 5% stronger than a good commercial pigment.

EXAMPLE XIII

Example I was repeated except that the sulfuric acid was replaced with a mixture of 20 gms. sulfuric acid and 5 gms. xylene sulfonic acid and the ethylene glycol was replaced with diethylene glycol. The results were equal to those of Example I.

EXAMPLE XIV

Example I was repeated with substitution of $Na_2HPO_4$ for $Na_2SO_4$. Results were essentially the same.

EXAMPLE XV

The general method of Example I was used with

| | Gms. |
|---|---|
| Copper phthalocyanine | 25 |
| 96% $H_2SO_4$ | 18 |
| $NaHSO_4$ | 75 |
| Ethylene glycol | 25 |

A strong blue pigment with a greenish shade was obtained.

EXAMPLE XVI

Example XV were repeated using $Al_2(SO_4)_3 \cdot 7H_2O$ in place of $NaHSO_4$. A similar greenish blue was obtained.

EXAMPLE XVII

In a quart WP mixer 97 gms. of 100% $H_3PO_4$ were added over about 1 hour to 140 gms. of copper phthalocyanine crude. The charge which had molar proportions of $4H_3PO_4$ to 1 phthalocyanine was a chunky nonuniform mass. After mixing for 3 hours, while the temperature rose to 70° C., the charge was granular and somewhat moist in appearance. To this were added 420 gms. of Na$_2$SO$_4$. After mixing for 30 minutes, the charge was a greenish blue powder. After adding 124 gms. of glacial acetic acid, the charge became a heavy paste and after mixing 1 hour, the mass was too heavy for the machine so another 60 gms. of glacial acetic acid was added and mixing was continued for another hour. After isolation, the pigment was found to be equal in strength to a high quality commercial phthalocyanine blue pigment.

EXAMPLE XVIII

Some 20 gms. of copper phthalocyanine were mixed with 24 gms. of a commercial grade of toluene sulfonic acid. After mixing for one hour, a green powder was obtained. To this were added 50 gms. of Na$_2$SO$_4$ and after mixing for about an hour, 30 gms. of ethylene glycol were added as fast as it would mix in. Mixing was continued for 5 hours. The pigment was recovered by adding the mass to 1000 ml. water, filtering, washing and drying. A good blue pigment was obtained.

EXAMPLE XIX

The general method of Example I was used with

|                         | Gms. |
|-------------------------|------|
| Copper phthalocyanine   | 20   |
| Trifluoroacetic acid    | 16   |
| Na$_2$SO$_4$            | 60   |
| Ethylene glycol         | 20   |

The resulting pigment was equal in strength to a good commercial phthalocyanine blue pigment.

EXAMPLE XX

Some 575 gms. copper phthalocyanine were mixed with 980 gms. of a 20% solution of aqueous sulfuric acid. This paste was dried in an acid-resistant pan at 85° C. overnight. The product weighed 770 gms. and was a bluish green solid.

EXAMPLE XXI

Some 10 gms. of phthalocyanine sulfate from Example XX were charged to a pint ball mill with 100 gms. of sodium sulfate and 300 gms. ½" porcelain balls. The mill was rolled for 72 hours. The blue powder was separated from the balls and was added to 500 ml. water. After stirring and heating to 50° C. the pigment was recovered by filtering, washing and drying. The product was similar to a commercial pigment.

EXAMPLE XXII

Example XXI was repeated with 10 gms. of copper phthalocyanine hepta sulfate with similar results. When the Na$_2$SO$_4$ was replaced with Na$_2$HPO$_4$, a stronger pigment was obtained. Use of sodium acetate gave a somewhat weaker pigment.

EXAMPLE XXIII

Some 20 gms. of copper phthalocyanine hepta sulfate, 100 gms. xylene and 300 gms. ½" porcelain balls were charged to a pint ball mill and rolled for 90 hours. The pigment was recovered by filtering and washing with ethanol and water. The product was equal to a good commercial pigment. When butanol was used in place of xylene, a similar but somewhat weaker product resulted.

EXAMPLE XXIV

In a small mixer with slow moving sigma blades, 27 gms. of copper phthalocyanine containing 1% chlorine were charged. Then 38 gms. of 96% sulfuric acid were added over a 30 minute period and the system was mixed for 30 minutes. Then, 54 gms. of sodium sulfate anhydrous were added and mixed for an additional 30 minutes. Then, over a period of 10 minutes, 24 gms. ethylene glycol were added. The system was mixed for 5 minutes to get a uniform heavy paste. The mixture was then stopped, and the system allowed to stand overnight. The next day the system was discharged into 500 ml. water, stirred, heated to 60° C., filtered, washed acid free, and dried at 80° C. The resulting phthalocyanine blue pigment was equal in strength to a good commercial pigment and was a greenish shade.

EXAMPLE XXV

Example XI was repeated except that mixing was stopped 15 minutes after the addition of acetic acid. After standing for 5 hours, the mass was drowned into 500 ml. water and the pigment was recovered. The pigment was equal to the product of Example XI.

EXAMPLE XXVI

Example I was repeated except that the mixing time after the glycol was reduced to 15 min. The product was 15% weaker than that of Example I.

While the present invention has been described by reference to certain preferred embodiments and examples, it is to be understood that it is not meant to be limited thereto but should be construed as broadly as any and all equivalents thereof.

We claim:

1. A process of preparing a phthalocyanine pigment which consists essentially of (1) forming a salt of a phthalocyanine starting material selected from metal-free phthalocyanine, copper phthalocyanine and aluminum phthalocyanine by reaction of from about 1 to about 8 mols of a strong acid selected from sulfuric acid, phosphoric acid, toluene sulfonic acid, trifluoroacetic acid, chlorosulfonic acid, ethyl sulfuric acid and trichloroaceite acid per mol of phthalocyanine starting material; (2) mixing the system comprising the phthalocyanine starting material and strong acid until a uniform mixture is obtained; and (3) regenerating the free phthalocyanine by adding with mixing a salt selected from the group consisting of an alkali metal sulfate, alkali metal acid sulfate, alkali metal phosphate, alkali metal acid phosphate, and an alkali metal salt of a lower alkanoic acid and a liquid selected from the group consisting of water, a lower alkanoic acid, lower alkanol, lower alkylene glycol, lower alkyl ester of a lower alkanoic acid and lower alkyl ketone.

2. The process of claim 1 wherein the strong acid is sulfuric acid.

3. The process of claim 1 wherein the salt is Na$_2$SO$_4$ and the liquid, water.

4. The process of claim 1 wherein the salt is Na$_2$SO$_4$ and the liquid, ethylene glycol.

References Cited

UNITED STATES PATENTS

| 2,765,318 | 10/1956 | Gross           | 260—314.5 |
| 2,765,319 | 10/1956 | Barnhart        | 260—314.5 |
| 2,840,568 | 6/1958  | Brouillard et al. | 260—314.5 |
| 3,080,375 | 3/1963  | Katz            | 260—314.5 |
| 2,930,796 | 3/1960  | Katz et al.     | 260—314.5 |
| 2,716,649 | 8/1955  | Brouillard      | 260—314.5 |

FOREIGN PATENTS

| 926,336 | 5/1963 | Great Britain | 260—314.5 |

HENRY R. JILES, Primary Examiner

H. I. MOATZ, Assistant Examiner